(12) United States Patent
Huntinghouse (10) Patent No.: US 10,791,702 B2
(45) Date of Patent: Oct. 6, 2020

(54) PET WASTE COLLECTOR (71) Applicant: Darlene Huntinghouse, Aurora, IL (US)

(72) Inventor: Darlene Huntinghouse, Aurora, IL (US)

( * ) Notice: Subject to any disclaimer, the term of this patent is extended or adjusted under 35 U.S.C. 154(b) by 920 days.

(21) Appl. No.: 15/048,355

(22) Filed: Feb. 19, 2016

(65) Prior Publication Data
US 2016/0242384 A1    Aug. 25, 2016

Related U.S. Application Data (60) Provisional application No. 62/118,895, filed on Feb. 20, 2015.

(51) Int. Cl.
*A01K 1/01*    (2006.01)

(52) U.S. Cl.
CPC .................. *A01K 1/0125* (2013.01)

(58) Field of Classification Search
CPC .. A01K 1/0107; A01K 1/0157; A01K 1/0114; A01K 1/0125; A01K 23/005; A01K 1/01
USPC ................. 119/165, 161, 169, 168
See application file for complete search history.

(56) References Cited

U.S. PATENT DOCUMENTS

| 5,412,842 | A * | 5/1995 | Riblett .................. E05D 5/12 16/250 |
| 6,802,281 | B2 * | 10/2004 | Otsuji .................. A01K 1/0157 119/168 |
| 7,673,584 | B2 | 3/2010 | Aley |
| 8,113,146 | B2 | 2/2012 | Askinasi |
| 8,439,000 | B1 | 5/2013 | Mehtupciu-Ionescu |
| 8,776,726 | B2 | 7/2014 | Hillman |
| 2007/0113793 | A1 * | 5/2007 | Kurahashi ............ A01K 1/0107 119/479 |
| 2007/0169707 | A1 * | 7/2007 | van Zuilekom ..... A01K 1/0107 119/169 |
| 2007/0179468 | A1 | 8/2007 | LaBelle |
| 2008/0083376 | A1 * | 4/2008 | Hurwitz ............... A01K 1/0107 119/167 |
| 2008/0178818 | A1 * | 7/2008 | Aley .................... A01K 1/0107 119/165 |
| 2009/0151646 | A1 | 6/2009 | Crawford |
| 2013/0160715 | A1 * | 6/2013 | Gouy .................... A01K 1/0107 119/166 |
| 2014/0338608 | A1 * | 11/2014 | Williams ............. A01K 1/0125 119/168 |

* cited by examiner

*Primary Examiner* — Peter M Poon
*Assistant Examiner* — Jeffrey R Larsen
(74) *Attorney, Agent, or Firm* — Erickson Law Group, PC (57) ABSTRACT

A pet waste collector is disclosed. The collector has a base collector, a wall collector, and a hinge. The base collector has a first frame and a first pet waste collecting surface. The first pet waste collecting surface is connected to the first frame. The wall collector has a second frame and a second pet waste collecting surface. The second pet waste collecting surface is connected to the second frame. The hinge pivotally connects the wall collector to the base collector. The wall collector is pivotal relative to the base collector about the hinge between a closed position and a raised position.

16 Claims, 11 Drawing Sheets

PET WASTE COLLECTOR

This application claims the benefit of U.S. Provisional Patent Application No. 62/118,895, filed on Feb. 20, 2015.

FIELD OF THE INVENTION

This invention relates in general to pet waste collectors.

BACKGROUND OF THE INVENTION

Many people have animals that they keep indoors as pets. Certain pets, such as dogs, can be trained to alert their owner of the need to relieve themselves, so the owner can let the pet outside.

However, it is sometimes difficult to train pets to alert their owners under all such circumstances. It may take time before a pet is fully trained and no longer relieves themselves indoors. Further, there are times when the owner may need to be away from the location of the pet and therefore no one may be available to let the pet out at the time of need.

The present inventor recognized the need for a pet waste collector that allows a pet to relieve itself indoors. The present inventor recognized the need for a pet waste collector to protect the surrounding area from pet waste. The present inventor recognized the need for a raised portion to catch waste that may be dispensed when a pet raises its leg. The present inventor recognized the need for a pet waste collector that is portable and collapsible to save space and for ease of transport and storage. The present inventor recognized the need for a pet waste collector having a raised portion that is pivotal and positionable relative to a base portion. The present inventor recognized the need for a pet waste collector with a disposable absorbent material. The present inventor recognized the need for mechanism to easily remove and attached absorbent material to a pet waste collector.

SUMMARY OF THE INVENTION

A portable pet waste collector for protecting a horizontal surface, such as a floor, and a raised surface, such as a wall, is disclosed. The collector has a base collector, a wall collector, and a hinge. The base collector has a first frame and a first pet waste collecting surface. The first pet waste collecting surface is connected to the first frame. The wall collector has a second frame and a second pet waste collecting surface. The second pet waste collecting surface is connected to the second frame. The hinge pivotally connects the wall collector to the base collector. The wall collector is pivotal relative to the base collector about the hinge between a closed position and a raised position.

Numerous other advantages and features of the present invention will become readily apparent from the following detailed description of the invention and the embodiments thereof, from the claims, and from the accompanying drawings.

DETAILED DESCRIPTION

The following description is presented to enable any person skilled in the art to make and use the invention. For the purposes of explanation, specific nomenclature is set forth to provide a plural understanding of the present invention. While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 1:
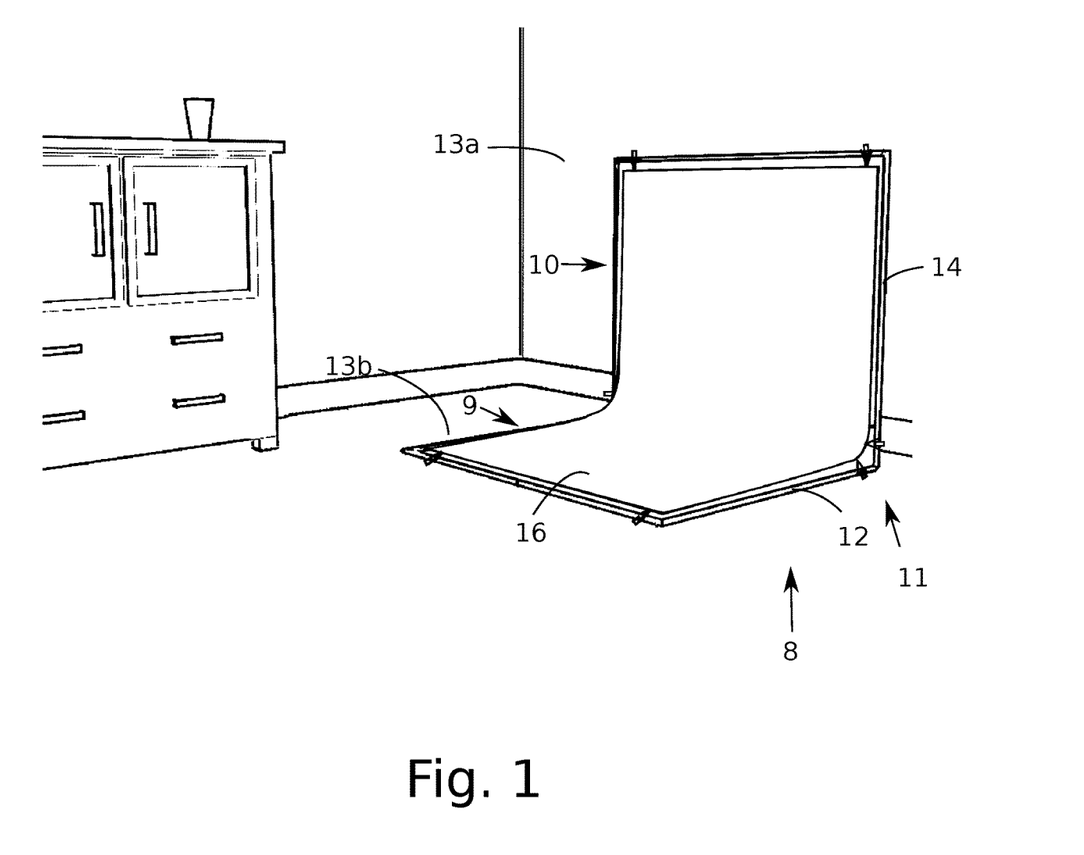
FIG. 1 is a perspective view an exemplary embodiment of a pet waste collector of the invention deployed in one application with trays not shown.

A pet waste collector 8 is disclosed. The collector 8 comprises a first collecting part 9, a second collecting part 10, and one or more hinges 19, 21, 23 connecting the first collecting part 9 to the second collecting part 10. The collector comprises a frame 11 and one or more absorbent materials 16. The frame 11 comprises a lower frame 12 and an upper frame 14. The first collecting part 9 comprises the lower frame 12 and a lower tray 15. The second collecting part 10 comprises an upper frame 14 and an upper tray 17. In some embodiments, the trays are not used and only the absorbent material 16 catches the waste. When the collector is in a vertical position as shown in FIG. 1, the first collecting part 10 is supported on an exterior surface, such as floor 13b, and the second collecting part 10 protects a vertical surface, such as a wall 13a.

The frame 11 is shown in more detail in FIGS. 2-7. The lower frame comprises three frame segments 12a, 12b, 12c. The upper frame 14 comprises three frame segments 14a, 14b, 14c. In some embodiments, each of the upper and lower frames comprise a fourth frame segments 12d, 14d. In some embodiments, the fourth frame segments are omitted. In some embodiments, frame segment 14b comprises a handle 18 to ease carrying of the collector. In some embodiments, both frame segments 12b and 14b comprise handles. In some embodiments, the frames 12, 14 comprises a quadrilateral, rectangular, square, or other shape. In some embodiments, the frame 12 is equal in size and shape to frame 14. In some embodiments, the frames 12, 14 are a rigid durable and material, such as metal or plastic. In some embodiments, the frames 12, 14, comprise an odor resistant material.

In some embodiments, the frame 11 comprises one or more mounting protrusions 30, 32, 34, 36, 38, 40, 42, 44. In some embodiments, the mounting protrusions are removeably attached to the frames, such as by threaded engagement with the respective frames. The mounting protrusions are spaced about the exterior side walls of the frame 11. Protrusion 30 is adjacent the corner of frame segments 14c, 14c on frame segment 14b. Protrusion 32 is adjacent the corner of frame segments 14a, 14b on frame segment 14b. Protrusion 34 is located on frame segment 14c adjacent edge 66. Protrusion 38 is located on frame segment 12c adjacent edge 68. Protrusion 36 is located on frame segment 14a adjacent edge 66. Protrusion 40 is located on frame segment 12a adjacent edge 68. Protrusion 42 is located on frame segment 12b adjacent the corner of frame segment 12b and 12c. Protrusion 44 is on frame segment 12b the adjacent the corner of frame segment 12a and 12b.

The absorbent material 16 comprises a plurality of loops 46, 48, 50, 52, 54, 56, 58, 60. The loops are attached to the main body of the absorbent material 16. The loops connect over each of the corresponding mounting protrusions 30, 32, 34, 36, 38, 40, 42, 44 to secure the absorbent material 16 to the frame 11. The loops allow the user to remove the absorbent material for cleaning, disposal, or replacement by drawing the loop over the top or the end of the protrusion to release the connection between the loop and the frame. In some embodiments, the loops comprise an elastic material, such as rubber or elasticized cotton. In some embodiments, the absorbent material is laid in the trays and not attached to the projections.

The absorbent material 16 is a flexible material. In some embodiments, the absorbent material comprises a fabric, cloth, cotton, sponge, fluff pulp, polymer, or a combination thereof. In some embodiments, the material 16 is disposable. In some embodiments, the absorbent material is a superabsorbent polymer. The superabsorbent polymer may comprise polyacrylamide copolymer, ethylene maleic anhydride copolymer, cross-linked carboxymethylcellulose, polyvinyl alcohol copolymers, cross-linked polyethylene oxide, starch grafted copolymer of polyacrylonitrile, or a combination thereof. In one example, the superabsorbent polymer may absorb by hydrogen bonding with water molecules.

In some embodiments, a water impermeable material is provided on the back side of the absorbent material to prevent pet waste from escaping from the absorbent material. In some embodiments, the water impermeable material comprises plastic, foam, vinyl, nylon, rubber, or a combination thereof. The water impermeable material may be flexible or stiff.

In some embodiments, the absorbent material or the water impermeable material comprises an adhesive backing and the adhesive backing attaches the absorbent material to the frame and/or the trays 15, 17. A user can remove the absorbent material by applying sufficient separating force between the layer and the frame and/or trays. In some embodiments, the absorbent material comprises the loops and the adhesive backing. In some embodiments, the absorbent material comprises at least two pieces, one piece is sized to fit in the bottom of the tray 15 between frame segments 12a, 12b, 12c, (and optionally 12d), the second piece is sized to fit in the bottom of the tray 17 between frame segments 14a, 14b, 14c, (and optionally 14d).

In some embodiments, the surface of the absorbent material opposite the trays comprises a decorative image, such as a fire hydrant, tree, tire or other image(s), object(s), or shape(s). In some embodiments, the absorbent material adjacent of the second part 10 comprises decorative image(s), object(s), or shape(s).

In some embodiments, the absorbent material will comprise a deodorizer for absorbing or neutralizing odors associated with pet waste. In some embodiments, the absorbent material comprises a fragrance or scent for offsetting or masking odors associated with pet waste. In some embodiments, the fragrance or scent will attract one or more types of pets to the collector and induce or encourage the pet to deposit pet waste by urination or otherwise.

Figure 6:
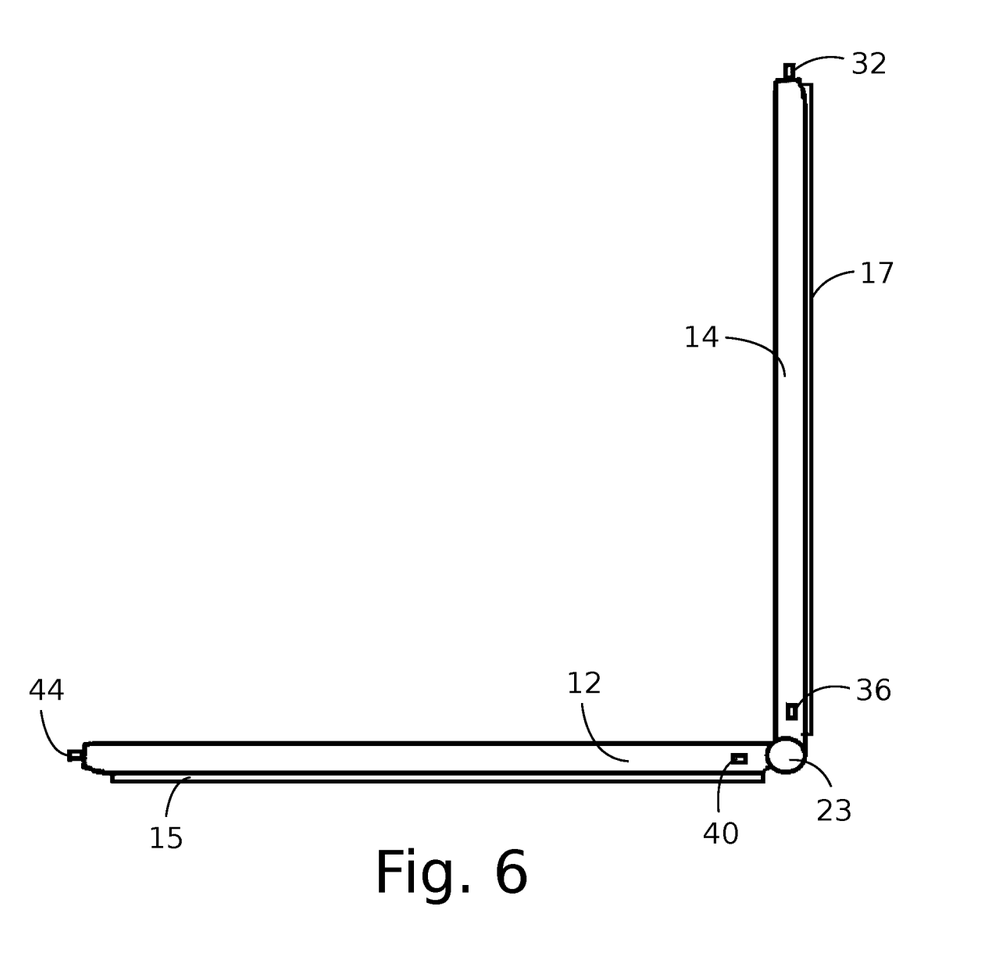
FIG. 6 is a side view of the collector of FIG. 1.
Figure 7:
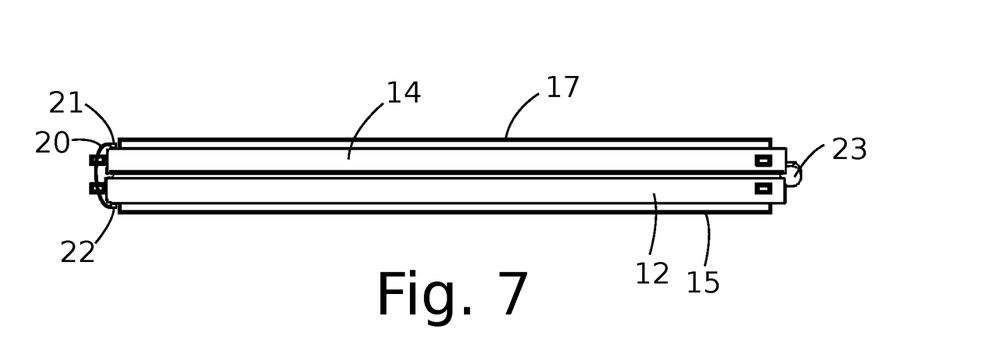
FIG. 7 is a side view of the collector of FIG. 6 shown in a closed position.

The lower tray 15 is mounted to the frame 12 and extends below the lowest part of the frame as shown in FIGS. 6 and 7. The lower frame 12 together with the tray 15 creates an at least partially enclosed space. The upper tray 17 is mounted to the frame 14 and extends beyond the rearmost part of the frame is shown in FIG. 6. The upper frame 14 together with the tray 17 creates an at least partially enclosed space.

The hinges 19, 21, 23 connect pivotally connected the lower tray 15 to the upper tray 17. In some embodiments, the hinges 19, 21, 23 connect directly to the trays 15 and 17. In some embodiments, where fourth frame segments 12d, 14d are provided, the hinges 19, 21, 23 are attached to each of the fourth frame segments 12d, 14d, which are attached to the corresponding trays. In some embodiments, the hinges comprise a rigid, durable material with substantial structural strength, such as steel, brass, or aluminum.

Figure 5:
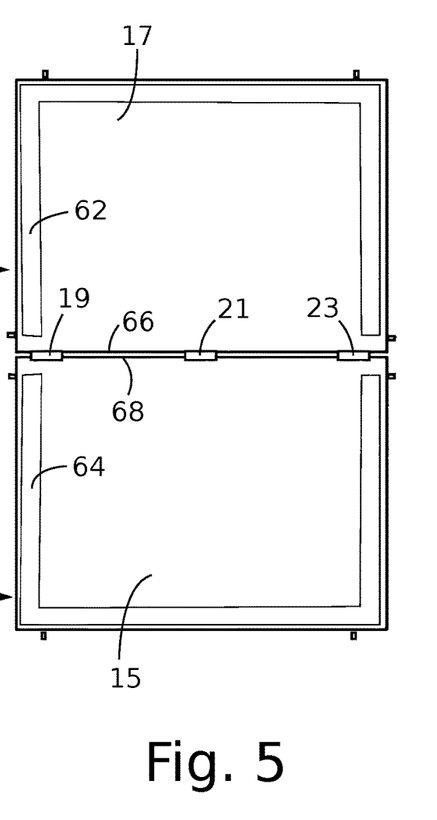
FIG. 5 is a bottom view of the collector of FIG. 2.

In embodiments, the trays 15, 17 each comprise traction strips 62, 64. The tractions strips may extend along the bottom of the trays adjacent the frames as shown in FIG. 5. In some embodiments, the traction strips also extend along and adjacent edges 66, 68. In some embodiments, the traction strips are traction feet located at each corner of the trays. The traction strips or feet provide a non-skid feature to maintain the collector in place on an exterior surface, such as floor 12b. In some embodiments, the traction strips are also located across the bottom of the trays, such as in an X-shape, or other in shapes or patterns.

Figure 8:
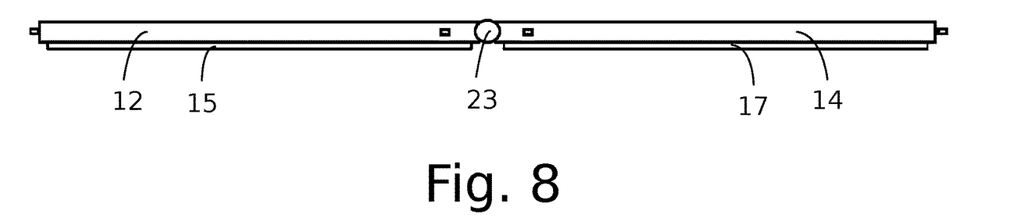
FIG. 8 is a side view of the collector of FIG. 6 shown in a straight position.

The hinges 19, 21, 23 allow the collector 8 to be configured in one of the plurality of positions. The collector comprises at least a closed position as shown in FIG. 7, an open vertical, L-shaped, or ninety degree position as shown in FIG. 1 and FIG. 6, and a straight position shown in FIGS. 4, 5, and 8.

In some embodiments, the frames segment 12b or 14b comprises a closing strap 20. The closing strap 20 is releasably connected to one or both of the frame segments 12b, 14b by snap connectors 21, 22. The closing strap 20 may secure, alone or together with the detent hinge, the collector in the closed position.

An exemplary detent hinge 70 is shown in FIGS. 9-12. The detent hinge 70 can be used in place of any or all of hinges 19, 21, 23. The hinge 70 has a first side 72, a second side 74, and a center section 73. The first side 72 comprises a first mount portion 76, a spring housing 80 and a first mid portion 78. The second side 76 comprises a second mount portion 82, a recessed portion 86, a second outer mid portion 84, and a second inner mid portion 85.

The second inner mid portion 85 is fixed to the second outer mid portion 84. The second outer mid portion 84 is fixed to the mount portion 82 and moves with the mount portion 82.

Figure 10:
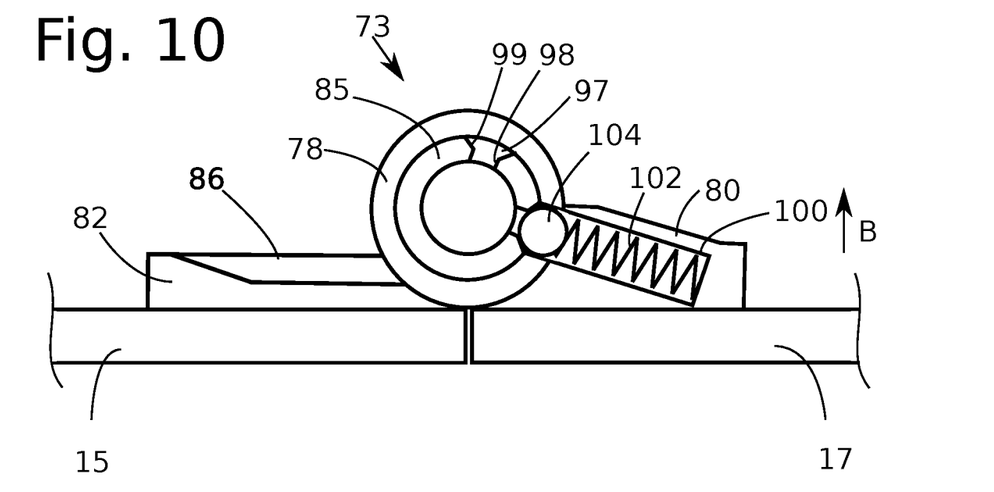
FIG. 10 is a section view of the hinge of FIG. 9 mounted on a portion of the collector of FIG. 2 taken along line 10-10 of FIG. 9 and shown in a straight position.
Figures 11, 12:
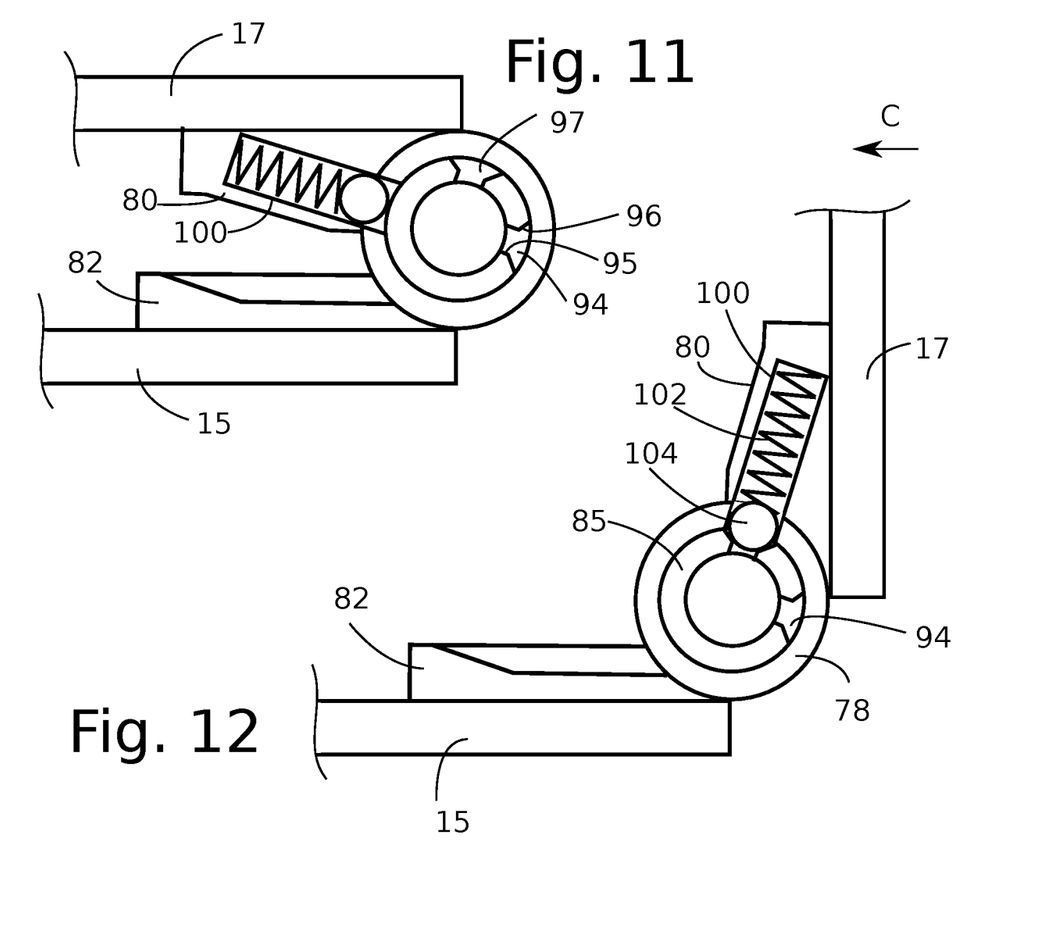
FIG. 11 is a section view of the hinge and collector of FIG. 10 shown in a closed position.
FIG. 12 is a section view of the hinge and collector of FIG. 10 shown in a raised position.

The first mount portion 76 is fixed to the first mid portion 78. The first mid portion 78 and the second inner mid portion 85 each may comprise a cylinder as shown in FIGS. 10-12. The first mid portion 78 moves together with the first mount portion 76 and together with the spring housing 80. The second inner mid portion 85 is concentric with the first mid portion 78.

The second inner mid portion 85 comprises one or more detent recesses, such a first detent recess 94 and a second detent recess 97. The first detent recess comprises a first section 95 and a mouth section 96. The second detent recess 97 comprises a first section 98 and a mouth section 99. The mouth sections 96, 99 expand as they extend toward the first mid portion 78 and are a wider than the corresponding first sections 95, 98.

The spring housing 80 comprises a spring shaft 100. The spring shaft comprises a spring 102 and a detent ball 104. The spring shaft 100 moves together with the spring housing and the first mid portion 78. The spring 102 biases the ball 104 towards the second inner mid portion 85.

FIGS. 10 through 12 show the detent hinge in various stages of operation. FIG. 10 shows the detent hinge in the straight open position. In the straight open position the trays 15, 17 are aligned. The spring shaft 100 is aligned with the first detent recess 94. The spring 102 biases the ball 104 into the first detent recess 94. The ball sits in the mouth 96 of the first detent recess. The engagement of the ball in the first detent recess 94 prevents rotation of the first side 72 and the tray 17 relative to the second side 74 and the tray 15, until a predetermined amount of force applied in the direction B shown in FIG. 10 overcomes the spring bias holding the ball into the first detent recess. The angled walls of the mouth 96 allowed the ball to roll up either of the walls depending on the direction of force when such predetermined force exceeds the spring bias force holding the ball within the mouth of the first detent recess. When a sufficient amount of a force is applied, the ball rolls up the side wall of the mouth of the first detent recess and rolls along the exterior surface of the second inner mid portion. When the ball reaches a detent recess, such as the second detent recess 97, the ball will fall into the mouth of that detent recess. When the ball is within the mouth of the detent recess the spring bias of the ball prevents the first side 72 from moving relative to the second side 74 to keep the trays 17, 15 fixed in position, until a predetermined amount of force is applied to overcome the detent bias provided by the spring 102 and ball sitting within the detent recess.

The ball is located in the second detent recess 97 and the tray 17 is located at ninety degrees from tray 15 in FIG. 12. This allows the collector 8 to be placed up against a wall or other vertical surface, such as shown in FIG. 1. The detent mechanism keeps the tray 17 from falling to a closed position. If a predetermined amount of force is applied in the direction C of FIG. 12 the spring bias will be overcome and the ball will roll up the side wall of the mouth of the second detent recess. The ball will then roll long the exterior surface of the second inner mid portion 85. And, if a predetermined amount of force is applied in the direction opposite direction C the spring bias will be overcome in the ball roll up the side wall of the mouth of the second detent recess and toward the first detent recess.

FIG. 11 shows the detent hinge in an exemplary closed position. Trays 15, 17 are parallel. The first portion 72 is spaced apart from the second portion 74 of the hinge. The ball is outside of both of the first and second detent recesses. Trays 15, 17 are spaced apart from each other and held in this position by the contact between corresponding the frame elements which extend from the trays and are not shown in FIG. 11.

In some embodiments, the detent hinge comprises a third detent recess located at the closed position shown in FIG. 11. In some embodiments, the first side 72 and the second side 74 of the hinge 70 are in surface to surface contact when the hinge is in the closed position. And, the spring housing 80 fit within the recess portion 86.

Figure 9:
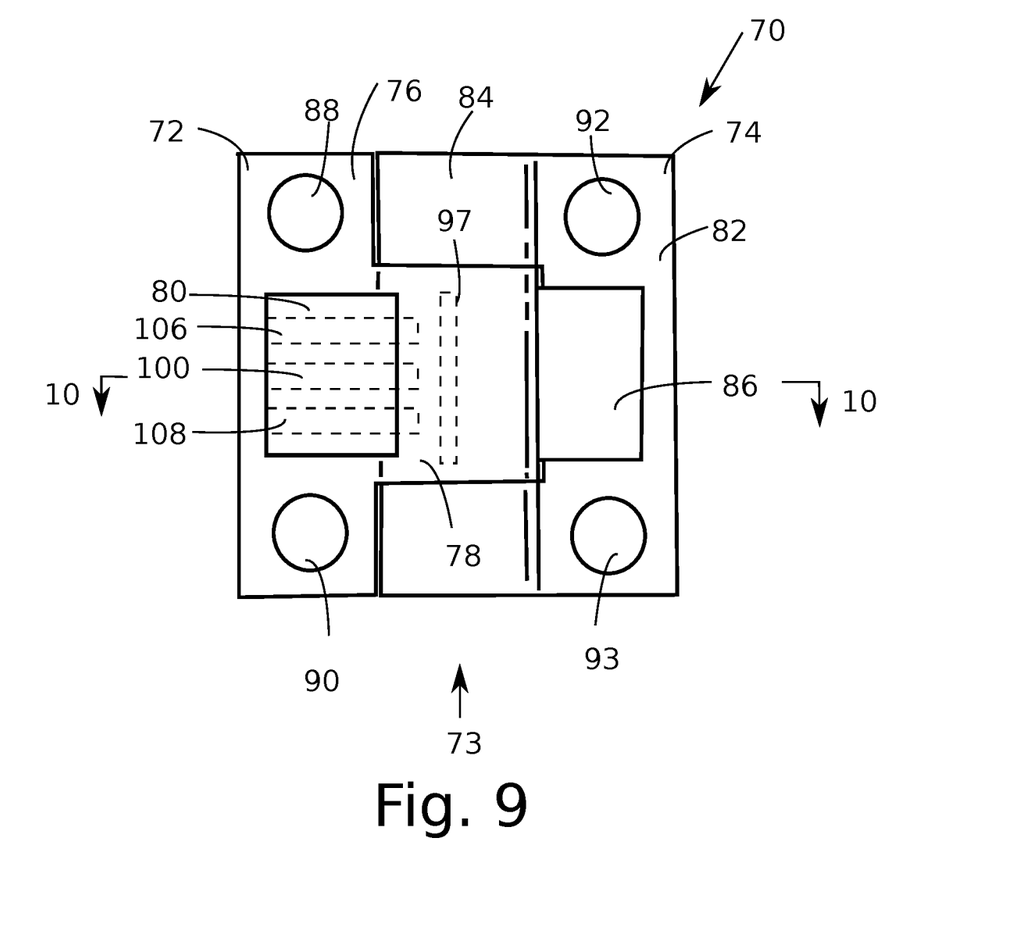
FIG. 9 is a front view of an alternative embodiment of a detent hinge of the collector of FIG. 1.

FIG. 9 shows two additional spring shafts 106, 108. The spring shafts 106, 108 comprise springs and balls and operate in the same manner as is described with spring shaft 100, spring 102, and ball 104. In some embodiments, only one spring shaft, spring, and ball is provided. In some embodiments, two, four, or more spring shaft, spring, and ball sets are provided. The more spring and ball sets that are used, the more predetermined force will be required to overcome the detent spring bias when the balls are within a detent recess.

In some embodiments, detent recesses are provided at other locations about the second inner mid portion 85. One or more detent recesses may be provided to the left of detent recess 97 to provide for holding the trays 15, 17 at an acute angle. In some embodiments, detent recesses are provided between detent recess 97 and detent recess 94 to hold the trays 15, 17 at an oblique angle.

In some embodiments, only one or two hinges are used. In some embodiments more than three hinges are used. In some embodiments, the outer hinges 19 and 23 are located at or beyond the outer edge of the respective frame segments 12c, 14c and 12a, 14a respectively.

Figure 2:
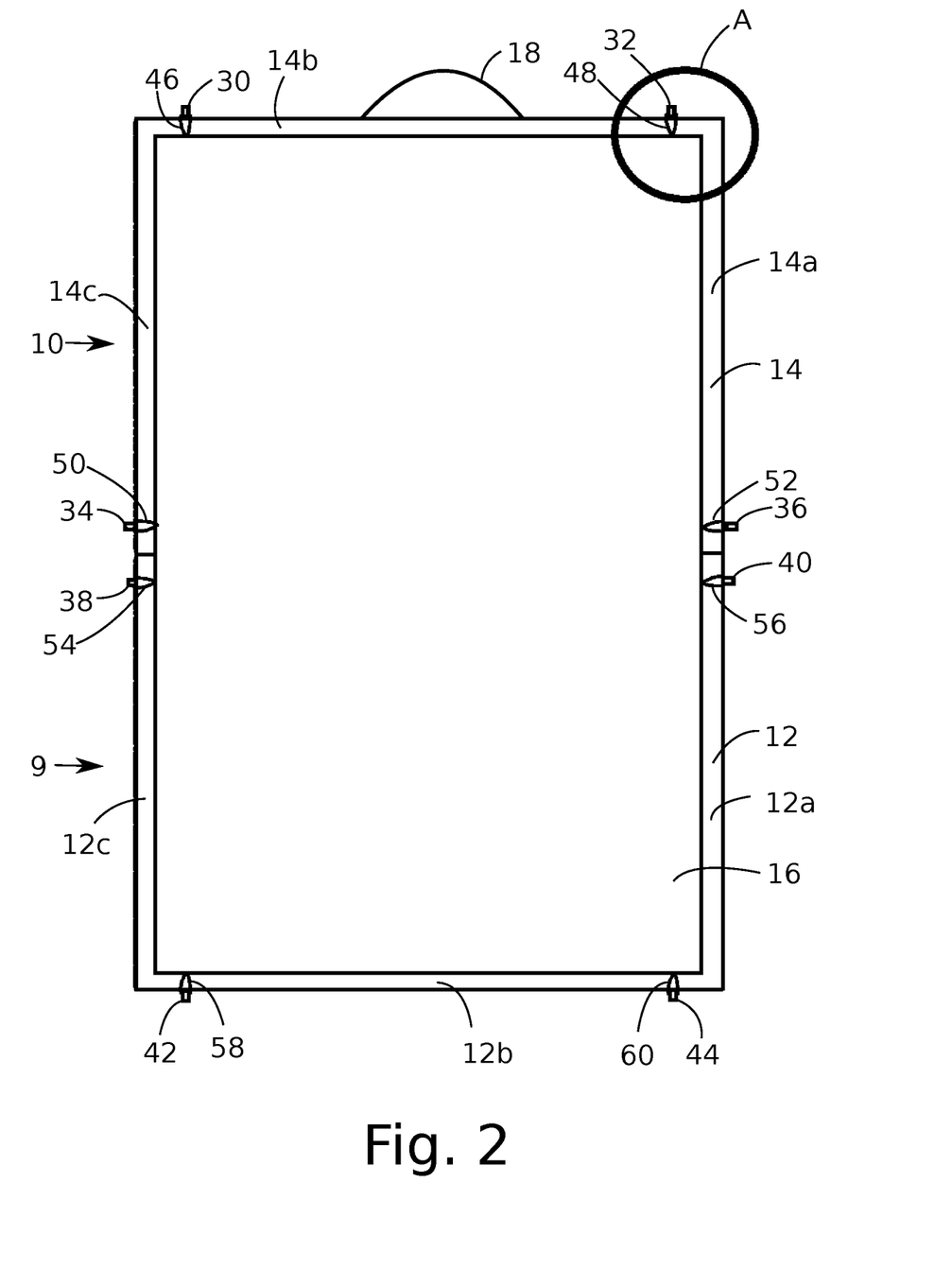
FIG. 2 is a top view the collector of FIG. 1 shown in a straight position.
Figure 3:
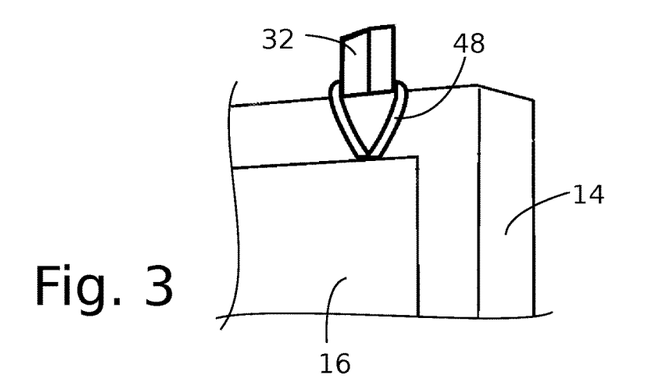
FIG. 3 is an enlarged perspective view of a portion of the collector taken from area A of FIG. 2.
Figure 4:
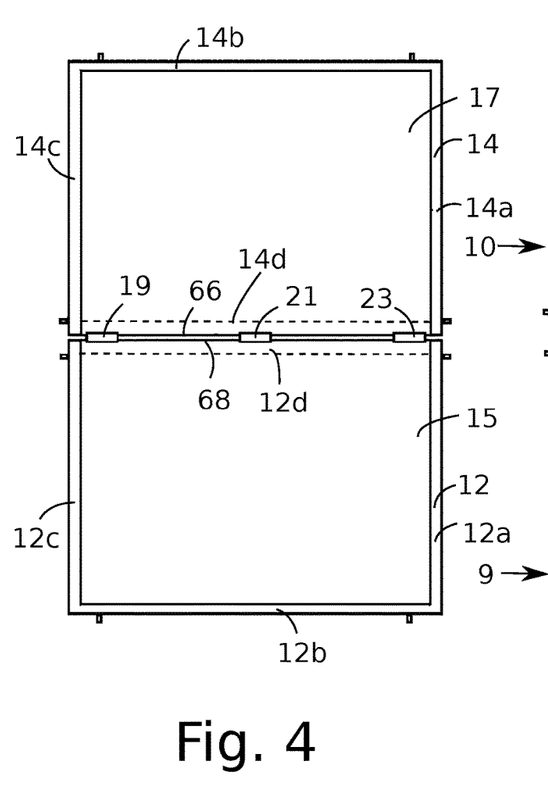
FIG. 4 is a top view of the collector of FIG. 2 with certain components not shown.
Figure 13:
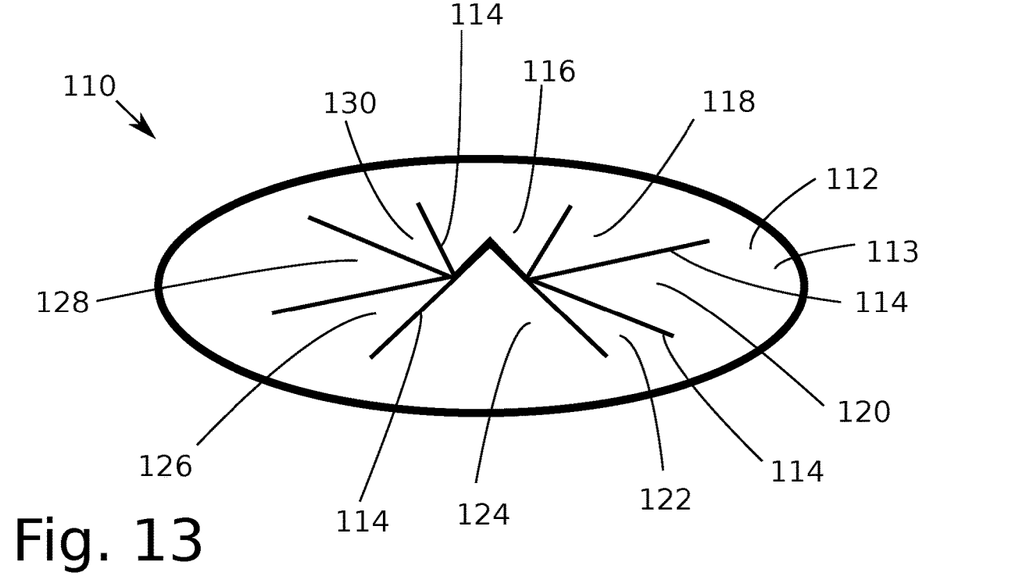
FIG. 13 is top view a gripper.
Figure 14:
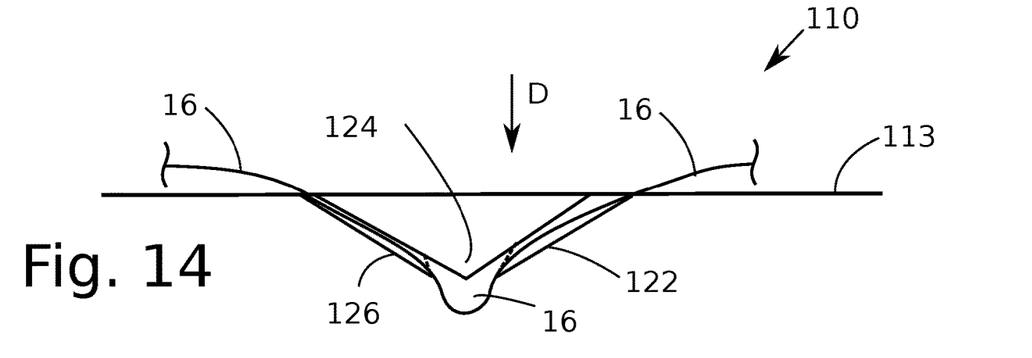
FIG. 14 is a side view of a gripper with a portion of an absorbent material gripped in the gripper.
Figure 15:
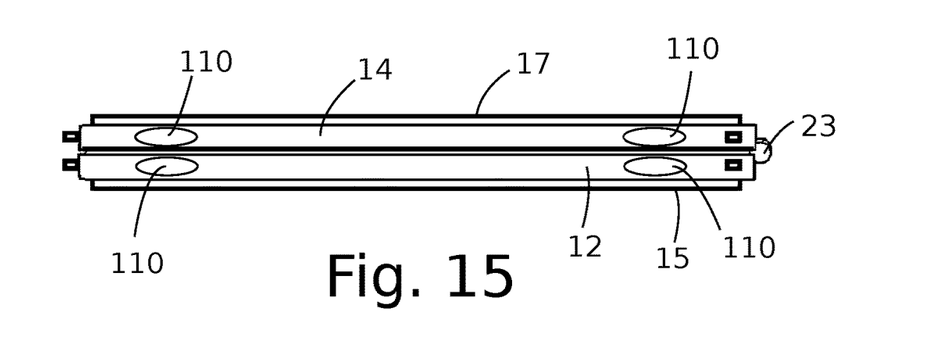
FIG. 15 is a side view of the collector of FIG. 7 comprising a plurality of grippers.

FIGS. 13 and 14 shows a gripper 110. FIG. 15 shows grippers 110 deployed about frame 12, 14. Grippers 110 can be used instead of or in addition to the mounting protrusions 30, 32, 34, 36, 38, 40, 42, 44 and loops 46, 48, 50, 52, 54, 56, 58, 60 to secure the absorbent material 16 to the frame. Holes may be cut in the frame at the locations of the grippers to mount the grippers to the frame or to allow the grippers to extend into frame. While FIG. 14 shows grippers mounted to the sidewalls of the frame, grippers can be mounted to any surface of the frame including the surface of the frame as shown in FIG. 2 or an outside surface of the frame as shown in FIG. 5. In some embodiments the grippers can be mounted to the trays such as the outside surface of the trays shown in FIG. 5.

The grippers 110 comprise a flexible material 112, such as plastic. A plurality of cuts 114 are provided in the flexible material to create a plurality of teeth 116, 118, 120, 122, 124, 126, 128, 130 each extending from a peripheral portion 113. The teeth are flexible and biased to a home position in or near the plane of peripheral portion 113.

The plurality of cuts 114 allow the teeth to flex and move in the direction D of FIG. 14 and in the direction opposite of direction D. The grippers can grip the absorbent material 16 when a user pushes a portion of the absorbent material 16 into the gripper. This drives the teeth downward as shown in FIG. 14. When the absorbent material 16 is located between two or more teeth, the teeth grip or bite the material 16 and prevent the material 16 from being withdrawn from the gripper. The material 16 occupies space adjacent the teeth and prevent the teeth from returning to the home position.

The various opposing and adjacent teeth therefore grip the material 16 under their bias to the home position.

To release the absorbent material from the gripper, the user presses the material 16 further in the direction D to release the teeth from engagement with the material 16. Then the teeth are held in the released position while the material 16 is removed from the gripper.

Figure 16:
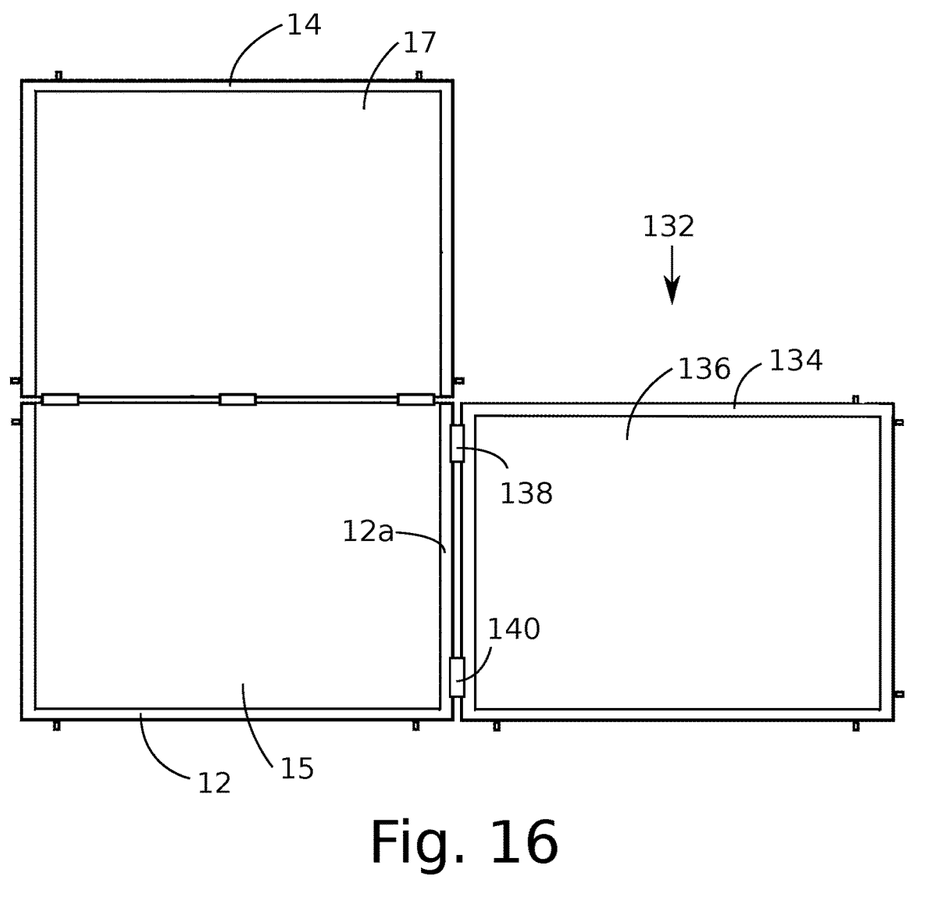
FIG. 16 is a top view of the collector of FIG. 2 having an extension in an open position connected to a lower frame.
Figure 17:
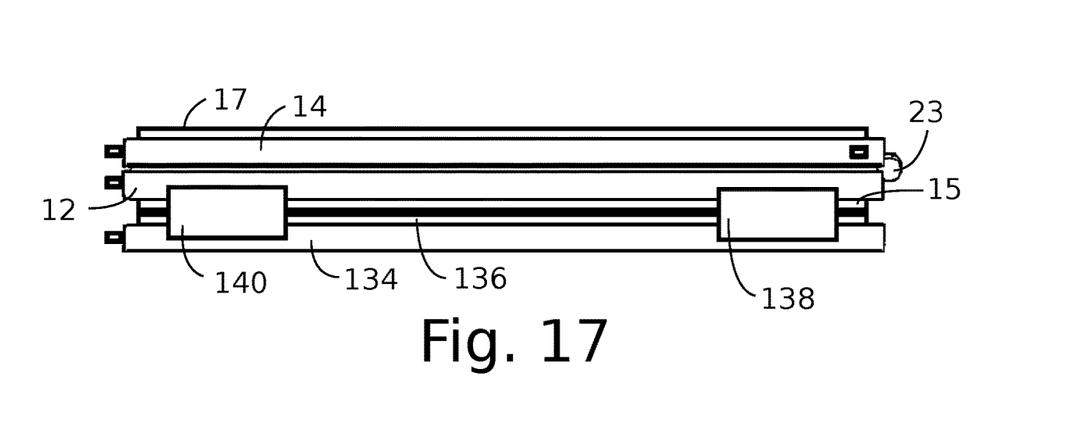
FIG. 17 is the collector of FIG. 16 having the extension in a closed position.

FIGS. 16 and 17 show the pet collector 8 comprising an extension 132. The extension 132 comprises a rectangular frame 134 and a third tray 136. The frame 134 and tray 136 are substantially the same as frame 12 and tray 15. Hinges 138, 140 pivotally connected the extension 132 to frame 12 at frame segment 12a. In some embodiments, clamps 142 are provided instead of hinges 138, 140 at the location of where the hinges are shown in FIG. 16. FIG. 17 shows the extension 132 moved under tray 15 about the hinges 138, 140 in a closed position for compact storage or transport.

Figure 18:
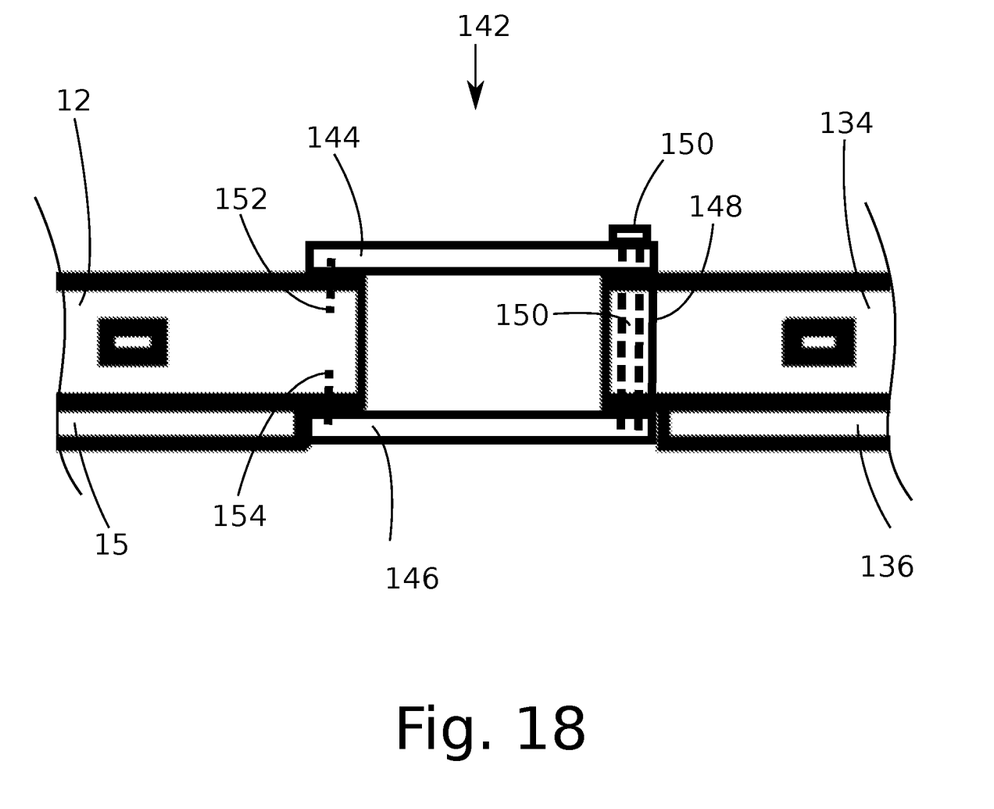
FIG. 18 is an enlarged side view of a clamp deployed on a portion of the collector of FIG. 16.

FIG. 18 shows a side view of a clamp 142 between frame 12 and extension 132. The clamp 142 can be used in place of hinges 138, 140 to connect the extension 132 to the frame. The clamp comprises a top arm 144, and a bottom arm 146. A threaded fastener 150 connects the top arm to the bottom arm. The top arm connects to a top surface of the frame 134 and frame 12. The bottom arm 146 connects to a bottom surface of the frame 134 and frame 12. A threaded fastener extends through the top arm 144 and is threaded into the bottom arm 146. Tightening of the threaded fastener the bottom arm 146 towards the top arm 144 to apply a gripping force about the frames 134, 12 to connect the extension 132 to the frame 12.

In some embodiments the clamp 142 comprises teeth 152, 154. The teeth extend towards each other on a side of the top and bottom arms opposite the threaded fastener. The teeth are configured to engage apertures in the frame 12 so that the teeth extend into the frame thereby providing a more secure connection between the clamp and the frame 12. In some embodiments, teeth are also provided on the side of the clamp having the threaded fastener.

In some embodiments a connector is provided. The connector comprises the top arm 144 a tooth 152 and an opposite tooth (not shown). The top arm 144 connects to frame 12 by engaging the tooth 152 into a corresponding recess of the frame. Likewise the top arm 144 connects to frame 134 by engaging the opposite tooth (not show) into the frame 134 at or about the location where the threaded fastener is shown in FIG. 18. Therefore, the connector attaches the extension 132 to the frame 12. Connectors may be provided in the locations of the hinges 138, 140 or at other locations along the adjacent sides of frames 12, 134.

Figure 19:
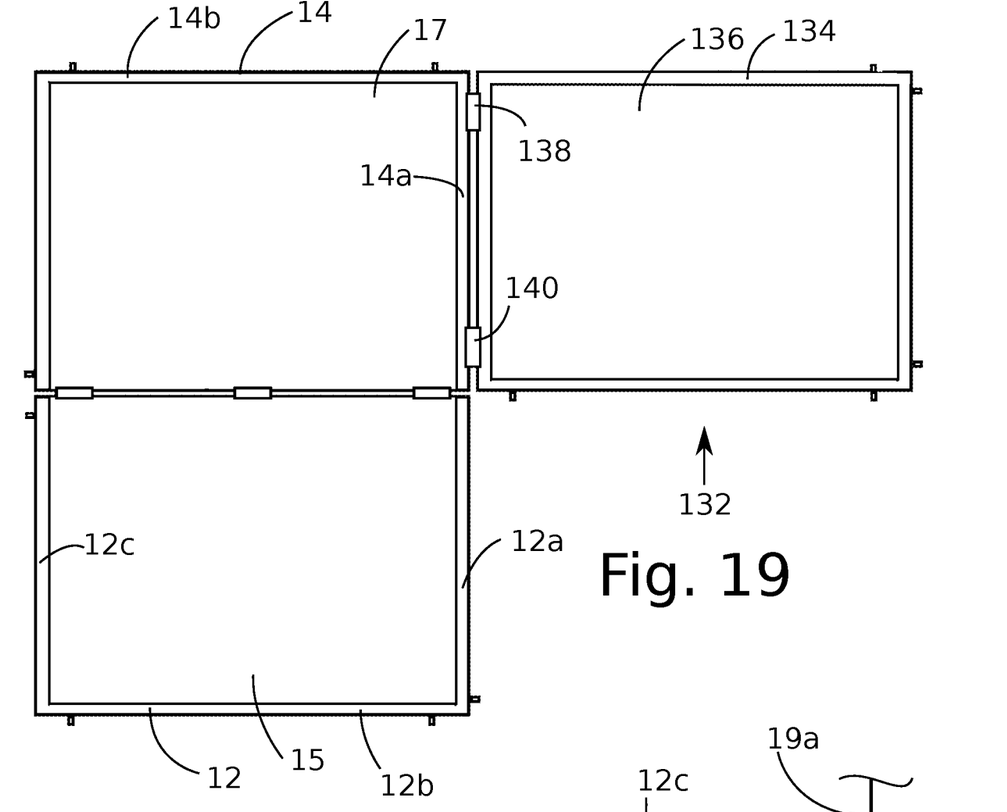
FIG. 19, is at top view of the collector of FIG. 2 having the extension in an open position connected to an upper frame.
Figure 20:
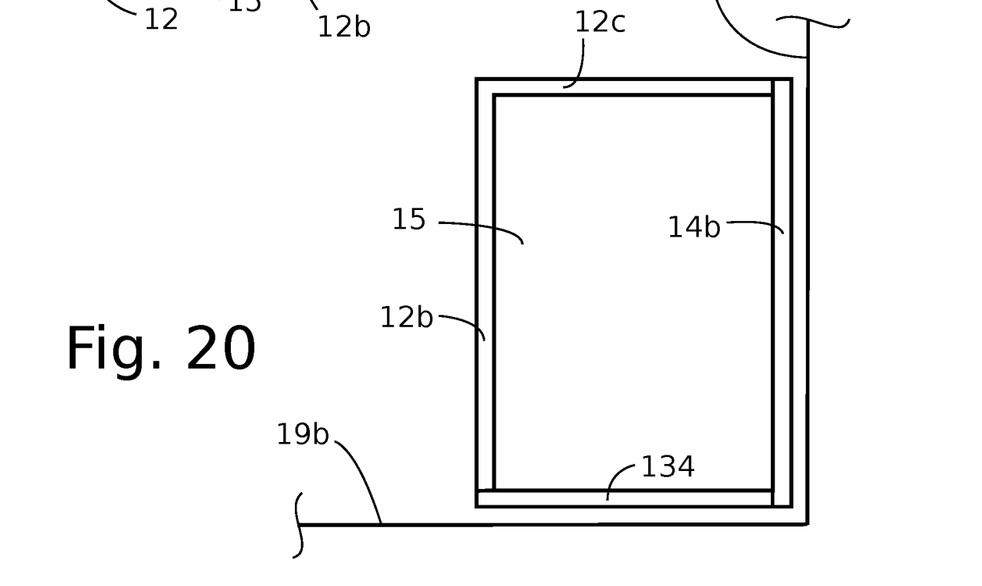
FIG. 20 is a top view of the collector of FIG. 19 shown in a raised position in an application having an intersection of two walls.

FIG. 19 shows an alternative attachment of the extension 132 to the frame segment 14a of the upper frame 14 rather than the lower frame 12 as shown in FIG. 16. When the extension 132 is connected to the frame 15 by hinges 138, 140, the extension is pivotal about those hinges to adjust to the contours of the wall or to conform to the intersection of two walls, such as a first wall 19a and a second wall 19b, as shown in FIG. 20. In FIG. 20, the upper frame 14 is positioned on or adjacent the first wall 19a, and the extension 132 is on or adjacent the second wall 19b, and the frame 134 of the extension is at a ninety degree angle from the upper frame 12. The extension 132 is located over or adjacent the frame segment 12a. Therefore the collector can protect two intersecting walls and be placed in a corner. The length of extension 132 is shown sized to align with the length of segment 12a. The extension 132 can rest and be supported on segment 12a and/or can be supported by the extension 132 connection to the frame 14, which is held in place by the detent hinge 70.

While the extension 132 is shown in FIGS. 16 and 19 extending from the right side of frame 12 and frame 14, respectively, it will be recognized that the extension could be connected to the left side of frame 12 and/or the left side of frame 14. Therefore extensions could extend from the both and right and left sides of the frame 12 or frame 14 or both frames 12 and 14. Further, extensions could extend forward from frame segment 12b of the frame 12 and/or forward or upward from frame segment 14b. As a result, the extensions provide a modular capability for extending the area of coverage provided by the collector 8.

In one application, a user places frame 12 on an exterior surface, such as a floor 13b adjacent a vertical surface, such as a wall 13a. The user will release the closing strap 20, if any, from frame 12 or 14. The user will lift, overcoming the detent ball's engagement with the third detent recess if one is provided, the second collecting part 10 to a raised position, such as a vertical position adjacent the wall 13a where the detent ball will fall into detent recess 97. If the absorbent material 16 is not already attached to the frames 12, 14 or trays 15, 17, then the user will attach the absorbent material to the frames or trays, such as by (1) securing the loops 46, 48, 50, 52, 54, 56, 58, 60 over the mounting protrusions 30, 32, 34, 36, 38, 40, 42, 44, and/or (2) pushing portions of the absorbent material into grippers that are spaced about the frame, and/or (3) laying absorbent material into the trays 15, 17 and allowing gravity or an adhesive backing hold the absorbent layer in place.

If an extension 132 is used, the extension is 132 folded out to an extended position about the hinges 138, 140 or the extension is otherwise attached to the frame 12. If not already connected, the absorbent material is then connected to the extension in the same manner as described above for frames 12, 14 or trays 15, 17. While the absorbent material is shown in FIG. 2 as a rectangle covering frames 12, 14, the absorbent material may comprise other shapes, such as an L-shape to cover frames 12, 14, 134 as those frames are shown positioned in FIG. 16.

In some embodiments, the frames 12, 14, 134, the trays 15, 17, 136, the hinges, the absorbent material, and or all components of the collector 8 are treated with an antimicrobial substance, such substances marketed under MICROBAN.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A portable pet waste collector for protecting a horizontal floor surface and a vertical surface, comprising:
   a base collector comprising a first frame, a rigid base collecting tray, and a first pet waste collecting surface, the first pet waste collecting surface connected to the first frame, the first pet waste collecting surface is a first water absorbent surface, the rigid base collecting tray connected to the first frame, the rigid base collecting tray is located behind the first pet waste collecting surface;
   a wall collector comprising a second frame, a rigid wall collecting tray, and a second pet waste collecting surface, the second pet waste collecting surface connected to the second frame, the second pet waste collecting surface is a second water absorbent surface, the rigid wall collecting tray connected to the second frame, the rigid wall collecting tray is located behind the second pet waste collecting surface;

a first hinge pivotally connecting the wall collector to the base collector, the wall collector is pivotal in a first direction relative to the base collector about the first hinge between a first closed position and a raised position where the second pet waste collecting surface is exposed to collect pet waste, the wall collector overlaps the base collector and covers the first pet waste collecting surface when in the first closed position;

a third collector comprising a third frame, a rigid third collecting tray, and a third pet waste collecting surface, the third pet waste collecting surface connected to the third frame, the third pet waste collecting surface is a third water absorbent surface, the rigid third collecting tray connected to the third frame, the third collecting tray is located behind the third pet waste collecting surface;

a second hinge, the second hinge pivotally connects the third collector to the base collector, the third collector is pivotal in a second direction relative to the base collector about the second hinge between a third collector closed position and a deployed position where the third pet waste collecting surface is exposed to collect pet waste, the third collector is horizontally adjacent to the base collector and horizontally oriented when in the deployed position, the third collector overlaps the base collector and the wall collector when the third collector is in the third collector closed position and the wall collector is in the first closed position, the third collector is horizontally offset from the wall collector when in the deployed position, the second hinge is transverse to the first hinge, the first direction is transverse to the second direction; and, a releasable locking mechanism configured to releasably hold the wall collector in the raised position.

2. The collector of claim 1, wherein the first pet waste collecting surface and the second pet waste collecting surface are a unified surface, and wherein the unified surface is a foldable water absorbent surface.

3. The collector of claim 1, wherein the releasable locking mechanism is a detent mechanism, and the first hinge comprises the detent mechanism.

4. The collector of claim 3, wherein the detent mechanism comprises a detent shaft, a detent ball, a detent spring, and a detent recess, the detent shaft comprising the detent ball and the detent spring, the detent shaft moveable relative to the detent recess, the detent spring biasing the detent ball into the detent recess when the detent shaft is adjacent the detent recess.

5. The collector of claim 1, wherein the wall collector comprises a straight open position where in the wall collector is substantially parallel to the base collector.

6. The collector of claim 1, wherein the raised position is a vertical position and the wall collector is positioned at a ninety degree angle to the base collector when the wall collector is in the vertical position.

7. The collector of claim 1, wherein the raised position is an acute position where the wall collector is at an acute angle relative to the base collector.

8. The collector of claim 1, wherein the raised position is an obtuse position where the wall collector is at an obtuse angle relative to the base collector.

9. The collector of claim 1, wherein the first frame and the second frame each comprises a plurality of mounting projections, and the first and second pet waste collecting surfaces each comprise a plurality of mounting loops, and the plurality of mounting loops are positionable over the corresponding plurality of mounting projections to secure the first and second pet waste collecting surfaces to the corresponding first and second frames.

10. The collector of claim 1, wherein the first or second frames comprise a plurality of grippers for holding the first pet waste collecting surface and the second pet waste collecting surface to the first frame and second frames, respectively.

11. The collector of claim 10, wherein each of the plurality of grippers comprise a plurality of opposing flexible teeth for releasably holding the first pet waste collecting surface and the second pet waste collecting surface to the first frame and second frames, respectively.

12. The collector of claim 1, wherein
the first pet waste collecting surface and the second pet waste collecting surface are a unified surface, and wherein the unified surface is a foldable water absorbent surface;
the first hinge comprises the releasable locking mechanism and the releasable locking mechanism is a detent mechanism; the detent mechanism comprises, a detent shaft, a detent ball, a detent spring, and a detent recess, the detent shaft comprising the detent ball and the detent spring, the detent shaft moveable relative to the detent recess, the detent spring biasing the detent ball into the detent recess when the detent shaft is adjacent the detent recess;
the wall collector comprises a straight open position where in the wall collector is substantially parallel to the base collector;
the raised position is a vertical position and the wall collector is positioned at a ninety degree angle to the base collector when the wall collector is in the vertical position; and,
the first frame and the second frame each comprises a plurality of mounting projections, and the first and second pet waste collecting surfaces each comprise a plurality of mounting loops, and the plurality of mounting loops are positionable over the corresponding plurality of mounting projections to secure the first and second pet waste collecting surfaces to the corresponding first and second frames.

13. A portable pet waste collector for protecting a horizontal floor surface and a vertical surface, comprising:
a floor collector comprising a first frame, a rigid base collecting tray, and a first pet waste collecting surface, the first pet waste collecting surface connected to the first frame, the first pet waste collecting surface is a first water absorbent surface, the rigid base collecting tray connected to the first frame, the rigid base collecting tray is located behind the first pet waste collecting surface;
a wall collector comprising a second frame, a rigid wall collecting tray, and a second pet waste collecting surface, the second pet waste collecting surface connected to the second frame, the second pet waste collecting surface is a second water absorbent surface, the rigid wall collecting tray connected to the second frame, the rigid wall collecting tray is located behind the second pet waste collecting surface; and,
a first hinge pivotally connecting the wall collector to the floor collector, the wall collector is pivotal in a first direction relative to the floor collector about the first hinge between a first closed position and a raised position where the second pet waste collecting surface is exposed to collect pet waste, the wall collector overlaps the base collector and covers the first pet waste collecting surface when in the first closed position;

a third collector comprising a third frame, a rigid third collecting tray, and a third pet waste collecting surface, the third pet waste collecting surface connected to the third frame, the third pet waste collecting surface is a third water absorbent surface, the rigid third collecting tray connected to the third frame, the third collecting tray is located behind the third pet waste collecting surface;

a second hinge, the second hinge pivotally connects the third collector to the wall collector, the third collector is pivotal in a second direction relative to the wall collector about the second hinge between an third collector closed position and a deployed position where the third pet waste collecting surface is exposed to collect pet waste, the third collector is horizontally adjacent to the wall collector and horizontally oriented when in the deployed position, the third collector overlaps the floor collector and the wall collector when the third collector is in the third collector closed position and the wall collector is in the first closed position, the third collector is horizontally offset from the wall collector when in the deployed position, the second hinge is transverse to the first hinge, the first direction is transverse to the second direction; and, a releasable locking mechanism configured to releasably hold the wall collector in the raised position.

14. The device of claim 1, wherein the wall collector completely overlaps the base collector when in the first closed position, the third collector completely overlaps the base collector and the wall collector when in the third collector closed position.

15. The device of claim 1, wherein the wall collector, the base collector, and the third collector are each parallel to each other when the wall collector is in the first closed position and the third collector is in the third collector closed position.

16. The device of claim 1, wherein then the third collector overlaps the base collector the third collector located with a perimeter of the base collector.

\* \* \* \* \*